US009788309B2

(12) United States Patent
Yu et al.

(10) Patent No.: US 9,788,309 B2
(45) Date of Patent: Oct. 10, 2017

(54) DATA TRANSMISSION METHOD AND TERMINAL (71) Applicant: Huawei Technologies Co., Ltd., Shenzhen (CN)

(72) Inventors: Rongdao Yu, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/694,587

(22) Filed: Apr. 23, 2015

(65) Prior Publication Data
US 2015/0230217 A1 Aug. 13, 2015

Related U.S. Application Data (63) Continuation of application No. PCT/CN2013/073469, filed on Mar. 29, 2013.

(30) Foreign Application Priority Data

Oct. 24, 2012 (CN) .......................... 2012 1 0409187

(51) Int. Cl.
H04W 4/00 (2009.01)
H04W 72/04 (2009.01)
H04W 72/02 (2009.01)
H04W 72/08 (2009.01)
H04L 5/00 (2006.01)

(52) U.S. Cl.
CPC ......... *H04W 72/042* (2013.01); *H04L 5/0007* (2013.01); *H04L 5/0037* (2013.01); *H04L 5/0044* (2013.01); *H04W 72/02* (2013.01); *H04W 72/082* (2013.01)

(58) Field of Classification Search
CPC ........... H04W 72/0406; H04W 72/042; H04W 72/02; H04W 72/082; H04L 5/0007; H04L 5/0037; H04L 5/0044
See application file for complete search history.

(56) References Cited

U.S. PATENT DOCUMENTS 6,061,549 A 5/2000 Labonte et al.
9,019,841 B2 * 4/2015 Tavildar ............. H04B 7/15542 370/246

(Continued)

FOREIGN PATENT DOCUMENTS

CN 102026307 A 4/2011
CN 102088736 A 6/2011
(Continued)

*Primary Examiner* — Kevin Mew
(74) *Attorney, Agent, or Firm* — Brinks Gilson & Lione (57) ABSTRACT A data transmission method, includes: detecting, by a first user terminal, PDCCH of second user terminals beyond a cell of the first user terminal, and acquiring modulation and coding scheme information from the PDCCH; estimating interference between the first user terminal and the second user terminals according to the modulation and coding scheme information; selecting a second user terminal having a minimum interference on the first user terminal according to the interference; and multiplexing, by the first user terminal, an uplink time-frequency resource of the second user terminal having the minimum interference to perform D2D data transmission.

15 Claims, 8 Drawing Sheets

(56) References Cited

U.S. PATENT DOCUMENTS

| | | | |
|---|---|---|---|
| 9,185,690 B2* | 11/2015 | Khoshnevis | H04W 72/042 |
| 2009/0325625 A1* | 12/2009 | Hugl | H04W 52/16 |
| | | | 455/522 |
| 2010/0240312 A1 | 9/2010 | Peng et al. | |
| 2010/0261469 A1* | 10/2010 | Ribeiro | H04W 99/00 |
| | | | 455/423 |
| 2012/0051315 A1* | 3/2012 | Wang | H04W 72/082 |
| | | | 370/329 |
| 2012/0113794 A1* | 5/2012 | Roman | H04B 7/0452 |
| | | | 370/201 |
| 2013/0022010 A1* | 1/2013 | Qianxi | H04L 5/0033 |
| | | | 370/329 |
| 2013/0078991 A1* | 3/2013 | Nam | H04B 7/024 |
| | | | 455/423 |
| 2013/0155962 A1* | 6/2013 | Hakola | H04W 72/042 |
| | | | 370/329 |
| 2013/0170387 A1* | 7/2013 | Wang | H04W 4/005 |
| | | | 370/252 |
| 2013/0252621 A1* | 9/2013 | Dimou | H04W 72/082 |
| | | | 455/450 |
| 2013/0252654 A1* | 9/2013 | Dimou | H04W 76/023 |
| | | | 455/509 |
| 2013/0308549 A1* | 11/2013 | Madan | H04W 28/26 |
| | | | 370/329 |
| 2014/0023008 A1* | 1/2014 | Ahn | H04W 76/023 |
| | | | 370/329 |
| 2014/0038653 A1* | 2/2014 | Mildh | H04W 28/048 |
| | | | 455/501 |
| 2014/0086152 A1* | 3/2014 | Bontu | H04L 1/1812 |
| | | | 370/329 |
| 2014/0086157 A1* | 3/2014 | Bontu | H04W 52/383 |
| | | | 370/329 |
| 2015/0230217 A1* | 8/2015 | Yu | H04W 72/02 |
| | | | 370/330 |

FOREIGN PATENT DOCUMENTS

| | | |
|---|---|---|
| CN | 103298113 A | 9/2013 |
| EP | 2 819 472 A1 | 12/2014 |
| WO | WO 2011/032274 A1 | 3/2011 |

* cited by examiner

Fig. 1

(Prior art)

DATA TRANSMISSION METHOD AND TERMINAL

CROSS-REFERENCE TO RELATED APPLICATIONS

This application is a continuation of International Application No. PCT/CN2013/073469, filed on Mar. 29, 2013, which claims priority to Chinese Patent Application No. 201210409187.1, filed on Oct. 24, 2012, both of which are hereby incorporated by reference in their entireties.

TECHNICAL FIELD

The present disclosure relates to the communications field, and in particular, to a data transmission method and a terminal.

BACKGROUND

The existing 3G and 4G cellular mobile communication systems belong to a typical infrastructure network, and a plurality of small power transmitters are used to replace a high power transmitter. Small coverage corresponding to each small transmission area forms a cell, each cell is allocated with a group of channels corresponding to a group of radio resources, and adjacent cells use different radio resources. Thus, no interference will be formed between the cells. The cells with far distances may repeatedly use the same radio resource (i.e., spatial multiplexing of a radio channel resource), so that the system capacity is greatly enlarged.

D2D (Device-to-Device) communication needs no control of a base station or an access node, thus communication or networking is very flexible. A direct advantage of introducing a terminal self-organization communication manner, namely, a D2D communication manner, between terminals of the cellular mobile communication system lies in that a nearby local service may be directly completed by relay forwarding between the terminals without adopting the base station, thus the occupation on resources of the base station is reduced; on the other hand, the coverage defect of a default network may be compensated to eliminate the defect that some blind areas always exist in the coverage area of the existing cellular mobile communication system; and on the third aspect, power consumption may be reduced, when the communication is implemented by multiple short paths instead of a long path, the sum of the power of the multiple short paths will be smaller than the power necessary for the long path; in addition, the self-organization manner is introduced to improve the flux of the entire mobile communication system and increase the multiplexing space.

By adopting the D2D communication manner, transmission may be performed at a non-authorized frequency band, but the interference of the non-authorized frequency band is uncontrollable, especially more and more services occur on the non-authorized frequency band, the interference will be more and more serious, thus the D2D transmission performance will be affected seriously.

SUMMARY

Embodiments of the present disclosure provide a data transmission method and a terminal. Before a user terminal performs D2D data transmission, user terminals beyond a cell of the user terminal multiplex a time-frequency resource of a user terminal having a minimum interference on the user terminal for performing D2D data transmission to the other user terminals, so as to reduce the interference of cellular transmission on D2D data transmission.

In a first aspect, the embodiments of the present disclosure provide a data transmission method. The method includes:

detecting, by a first user terminal, physical downlink control channel (PDCCH) of second user terminals beyond a cell of the first user terminal, and acquiring modulation and coding scheme information from the PDCCH;

estimating interference between the first user terminal and the second user terminals according to the modulation and coding scheme information;

selecting a second user terminal having a minimum interference on the first user terminal according to the interference; and multiplexing, by the first user terminal, an uplink time-frequency resource of the second user terminal having the minimum interference to perform D2D data transmission.

In a second aspect, the embodiments of the present disclosure provide a data transmission method. The method includes:

establishing an interference mapping table according to interference between a first user terminal and second user terminals beyond a cell of the first user terminal;

finding out multiple second user terminals having small interference on the first user terminal according to the interference mapping table;

selecting an available second user terminal having a minimum interference from the multiple second user terminals having small interference on the first user terminal; and multiplexing, by the first user terminal, an uplink time-frequency resource of the available second user terminal having the minimum interference to perform D2D data transmission.

In a third aspect, the embodiments of the present disclosure provide a data transmission method. The method includes:

performing, by a first user terminal, subcarrier energy detection on first orthogonal frequency division multiplexing (OFDM) symbols of a uplink sub-frame corresponding to second user terminals beyond a cell of the first user terminal when performing information transmission;

estimating interference between the first user terminal and the second user terminals according to a energy detection result;

selecting a second user terminal having a minimum interference on the first user terminal according to the interference; and multiplexing, by the first user terminal, a low-energy subcarrier beginning from the $n^{th}$ OFDM symbol of a uplink sub-frame corresponding to the second user terminal having the minimum interference, in order to perform D2D data transmission.

In a fourth aspect, the embodiments of the present disclosure provide a data transmission terminal The terminal includes:

a detecting unit, configured to detect PDCCH of second user terminals beyond a cell of the data transmission terminal, and acquire modulation and coding scheme information from the PDCCH;

an estimating unit, configured to estimate interference between the data transmission terminal and the second user terminals according to the modulation and coding scheme information;

a selecting unit, configured to select a second user terminal having a minimum interference on the data transmission terminal according to the interference; and a transmitting unit, configured to multiplex an uplink time-frequency resource of the second user terminal having the minimum interference to perform D2D data transmission.

In a fifth aspect, the embodiments of the present disclosure provide a data transmission terminal. The terminal includes:

an establishing unit, configured to establish an interference mapping table according to interference between the data transmission terminal and second user terminals beyond a cell of the data transmission terminal;

a finding-out unit, configured to find out multiple second user terminals having a minimum interference on the data transmission terminal according to the interference mapping table;

a selecting unit, configured to select an available second user terminal having the minimum interference from the multiple second user terminals having small interference on the data transmission terminal; and a transmitting unit, configured to multiplex an uplink time-frequency resource of the available second user terminal having the minimum interference to perform D2D data transmission.

In a sixth aspect, the embodiments of the present disclosure provide a data transmission terminal. The terminal includes:

a detecting unit, configured to perform subcarrier energy detection on first OFDM symbols of a uplink sub-frame corresponding to second user terminals beyond a cell of the data transmission terminal when performing information transmission;

an estimating unit, configured to estimate interference between the data transmission terminal and the second user terminals according to a energy detection result;

a selecting unit, configured to select a second user terminal having a minimum interference on the data transmission terminal according to the interference; and a transmitting unit, configured to multiplex a low-energy subcarrier beginning from the $n^{th}$ OFDM symbol of a uplink sub-frame corresponding to the second user terminal having the minimum interference, in order to perform D2D data transmission.

According to the data transmission method and a terminal provided by the embodiments of the present disclosure, before a user terminal performs D2D data transmission, a user terminal having the minimum interference on the user terminal is detected and found out, and the time-frequency resource of the user terminal having the minimum interference is multiplexed, so as to ensure the minimum interference generated by cellular transmission on the user terminal during D2D transmission.

DESCRIPTION OF EMBODIMENTS

To make objectives, technical solutions and advantages of embodiments of the present disclosure more clearly, a clear and complete description of technical solutions of the embodiments of the present disclosure will be given below, in combination with the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
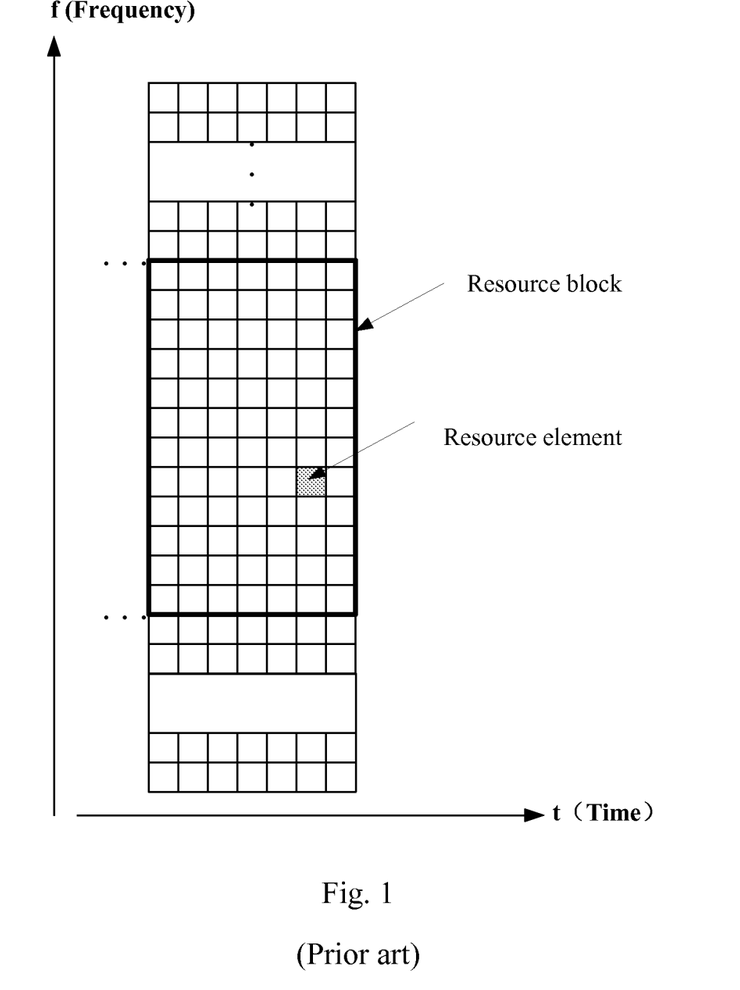
FIG. 1 is a schematic diagram of a two-dimensional time-frequency resource.

A data transmission method provided in the embodiments of the present disclosure can be applied to data transmission between D2D user terminals in a long term evolution (Long Term Evolution, LTE) system. In the LTE system, data are transmitted on a two-dimensional time-frequency resource. As shown in FIG. 1, it is a schematic diagram of the two-dimensional time-frequency resource, wherein a horizontal axis represents a time domain, a longitudinal axis represents a frequency domain, and the minimum resource unit used during data transmission is a resource element (Resource Element, RE). Actually, scheduling and transmission of the data are performed with a resource block (Resource Block, RB) as a unit, and one resource block is composed of multiple resource elements on the two-dimensional time domain and frequency domain. In general, one resource block is composed of 7 orthogonal frequency division multiplexing (Orthogonal Frequency Division Multiplexing, OFDM) symbols on the time domain and 12 subcarriers on the frequency domain. A D2D user terminal transmits data to another D2D user terminal by multiplexing the time-frequency resource of a cellular user terminal having small interference, to ensure the minimum interference between cellular transmission and D2D transmission.

It should be noted that, the embodiment of the present disclosure can be applied to a LTE system, but is not limited to the LTE system and may be replaced by other equivalent systems.

Figure 2:
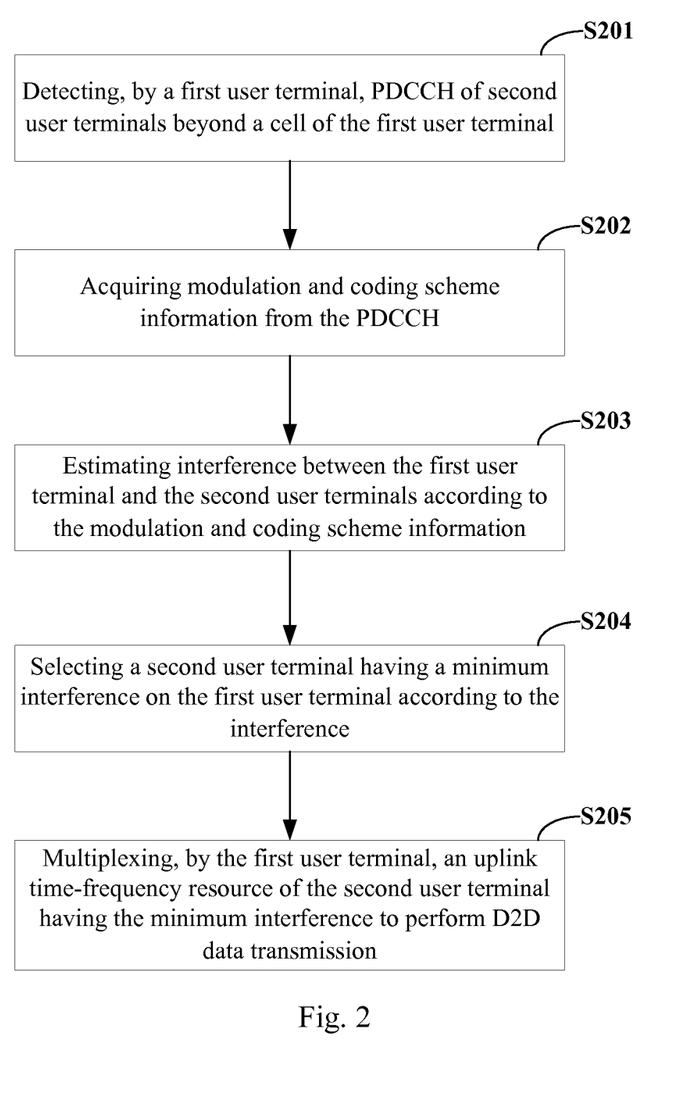
FIG. 2 is a flowchart of a data transmission method provided by an embodiment of the present disclosure.

A data transmission method of the embodiment of the present disclosure will be described below in detail by taking FIG. 2 as an example. FIG. 2 is a flowchart of a data transmission method provided by an embodiment of the present disclosure. The executive body of the embodiment is a user terminal for D2D data transmission.

Firstly, it should be noted that, the cellular user terminal performs data transmission by using a physical downlink shared channel (Physical Downlink Shared Channel, PDSCH), and in order to enable the cellular user terminal to correctly receive data, a base station indicates a resource block occupied during data transmission through a physical downlink control channel (Physical Downlink Control Channel, PDCCH). By detecting the PDCCH of the cellular user terminal, a D2D user terminal may estimate the interference between the cellular user terminal and the D2D user terminal by detecting the PDCCH of the cellular user terminal, and multiplex the time-frequency resource of the cellular user terminal having small interference to perform D2D data transmission.

The step of the data transmission method of the embodiment is as follows:

step 201, a first user terminal detects PDCCH of second user terminals beyond a cell of the first user terminal.

Wherein, the first user terminal is a user terminal performing data transmission by use of D2D. The second user terminals are user terminals beyond the cell of the first user terminal, and the user terminals perform data transmission by use of cells. Since the distances between the user terminals in the same cell are small, the mutual interference is large, thus the first user terminal only detects the user terminals performing data transmission by use of cells and beyond the cell thereof, namely, the second user terminals.

It should be noted that, the first user terminal may only detect one second user terminal and may also simultaneously detect multiple second user terminals.

Such information is carried in the PDCCH as modulation and coding scheme (Modulation and Coding Scheme, MCS) information, hybrid automatic repeat request (Hybrid Automatic Repeat request, HARQ) information and the like, thus the PDCCH of the second user terminal is detected to acquire corresponding information.

Preferably, the first user terminal detects the PDCCH of the second user terminal by means of the ID of the second user terminal.

Preferably, the first user terminal randomly selects the PDCCH for analyzing such fields indicated by the PDCCH as time-frequency resource information and the like to determine whether the data length thereof meets standards, so as to judge whether the PDCCH is a reasonable PDCCH of the second user terminal (namely, a user terminal performing data transmission by use of a cell). If the PDCCH is the reasonable PDCCH of the second user terminal, the PDCCH is detected.

Step S202, the MCS information is acquired from the PDCCH.

The MCS information indicates the signal noise ratio (Signal Noise Ratio) of the user terminal, and the signal noise ratio indicates the distance between the user terminal and the base station. The larger the distance between the second user terminal and the base station is, the larger the distance between the second user terminal and the first user terminal is, and the smaller the mutual interference is.

Step S203, interference between the first user terminal and the second user terminals are estimated according to the MCS information.

TABLE 1

| MCS index $I_{MCS}$ | Modulation order $Q_m$ | Transmission block index $I_{TBS}$ |
|---|---|---|
| 0 | 2 | 0 |
| 1 | 2 | 1 |

TABLE 1-continued

| MCS index $I_{MCS}$ | Modulation order $Q_m$ | Transmission block index $I_{TBS}$ |
|---|---|---|
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In a LTE system, the MCS information has 32 grades in total. As shown in table 1, it is an MCS information table in the LTE system. The MCS information of each grade corresponds to one modulation order (modulation order) and corresponds to one transmission block index at the same time, and the transmission block index implicitly indicates a code rate adopted during data transmission. The larger the difference of the code rates is, the larger the difference of the signal noise ratio is. It can be seen from the table that, the difference of the code rates of the MCS information of the same modulation order is quite small, thus for simplifying the operation, the interference between the first user terminal and the second user terminals may be estimated through the modulation orders corresponding to the MCS information.

Specifically, the modulation order corresponding to the MCS information of the first user terminal is compared with the modulation order corresponding to the MCS information of the second user terminal. The larger the difference between the modulation order corresponding to the MCS information of the first user terminal and the modulation order corresponding to the MCS information of the second user terminal is, the smaller the interference between the first user terminal and the second user terminal is. By adopting the judging method, the times of detecting and analyzing the PDCCH of the second user terminal by the first user terminal may be reduced, and the complexity may be reduced.

Step S204, the second user terminal having the minimum interference on the first user terminal is selected according to the interference.

Specifically, the second user terminal having the largest difference with the modulation order corresponding to the MCS information of the first user terminal is selected, according to the estimating result in step S203.

It should be noted that, as long as the modulation order corresponding to the MCS information of the first user terminal is different from the modulation order corresponding to the MCS information of the second user terminal, the interference between the first user terminal and the second user terminal is quite small, so that when the second user terminal having the largest difference with the modulation order corresponding to the MCS information of the first user terminal could not be selected due to a particular condition, the second user terminal different from the modulation order corresponding to the MCS information of the first user terminal may also be selected.

Step S205, the first user terminal multiplexes an uplink time-frequency resource of the second user terminal having the minimum interference to perform D2D data transmission.

After selecting the second user terminal having the minimum interference, the first user terminal multiplexes the uplink time-frequency resource of the second user terminal to send D2D data to another user terminal, so that when the first user terminal performs D2D data transmission to other user terminals, the interference caused by cellular transmission is greatly reduced.

Figure 3:
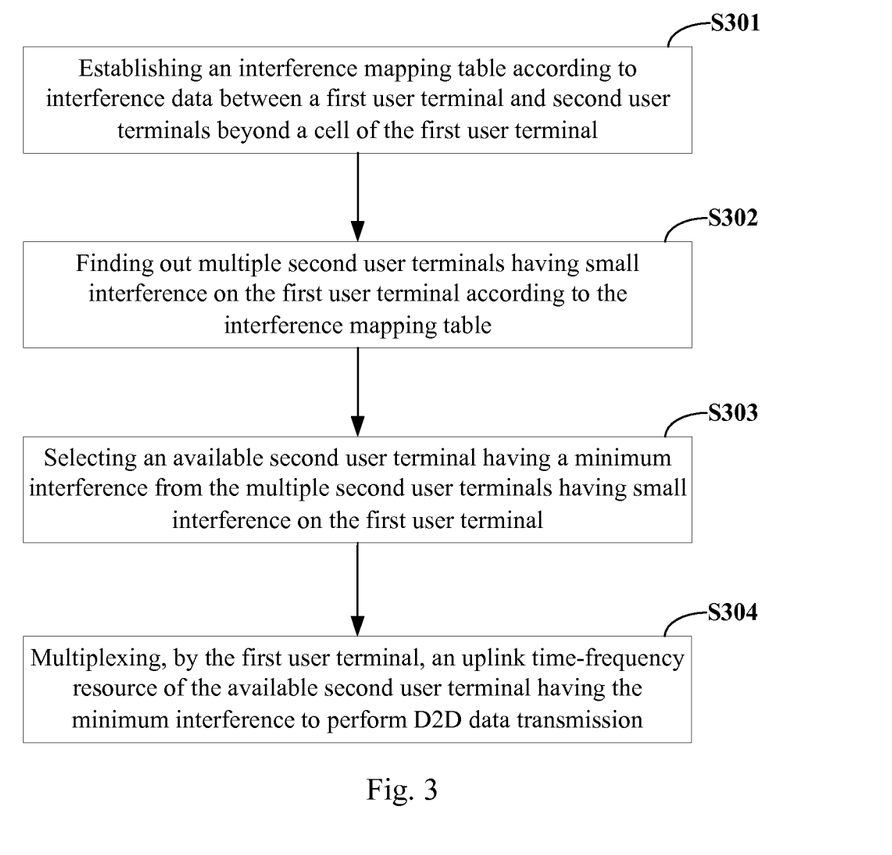
FIG. 3 is a flowchart of another data transmission method provided by an embodiment of the present disclosure.

Another data transmission method according to the embodiment of the present disclosure will be described below in detail by taking FIG. 3 as an example. FIG. 3 is a flowchart of another data transmission method provided by an embodiment of the present disclosure.

According to the data transmission method in the embodiment, a user terminal having the minimum interference is found out by establishing an interference mapping table. As shown in FIG. 3, the data transmission method provided by the embodiment includes the following steps:

step S301, a interference mapping table is established according to interference between a first user terminal and second user terminals beyond a cell of the first user terminal.

Wherein, the first user terminal is a user terminal performing data transmission by use of D2D. The second user terminals are user terminals beyond the cell of the first user terminal, and the user terminals perform data transmission by use of cells. Since the distances between the user terminals in the same cell are small, the mutual interference is large, thus the first user terminal only detects the user terminals performing data transmission by use of cells and beyond the cell thereof, namely, the second user terminals.

Preferably, the establishment method of the interference mapping table is as follows: detecting the PDCCH of the second user terminals beyond the cell of the first user terminal; performing PDSCH signal energy detection on sub-frames corresponding to time-frequency resource information indicated by the PDCCH during data transmission of the second user terminals; the smaller the PDSCH signal energy is, the smaller the interference between the first user terminal and the second user terminals is; and establishing the interference mapping table between the first user terminal and multiple second user terminals according to the detection result.

Wherein, the first user terminal detects the PDCCH of the second user terminal by means of the ID of the second user terminal. Or, the first user terminal randomly selects the PDCCH for analyzing such fields indicated by the PDCCH as time-frequency resource information and the like to determine whether the data length thereof meets standards, so as to judge whether the PDCCH is a reasonable PDCCH of the second user terminal (namely, a user terminal performing data transmission by use of a cell). If the PDCCH is the reasonable PDCCH of the second user terminal, the PDCCH is detected.

Preferably, the establishment method of the interference mapping table is as follows: detecting the Sounding signals of the second user terminals beyond the cell of the first user terminal; the weaker the Sounding signals are, the smaller the interference between the first user terminal and the second user terminals is; and establishing the interference mapping table between the first user terminal and multiple second user terminals according to the detection result.

Step S302, multiple second user terminals having small interference on the first user terminal are found out according to the interference mapping table.

The interference between the first user terminal and the multiple second user terminals are included in the interference mapping table. Multiple second user terminals having small interference on the first user terminal are found out according to the interference mapping table. The degree of the small interference may be selected differently according to different conditions.

Step S303, an available second user terminal having the minimum interference is selected from the multiple second user terminals having small interference on the first user terminal;

when the second user terminal having the minimum interference on the first user terminal in the interference mapping table could not be selected due to a particular condition, the second user terminal having smaller interference on the first user terminal in the interference mapping table is selected, namely, the available second user terminal having the minimum interference is selected.

Step S304, the first user terminal multiplexes an uplink time-frequency resource of the available second user terminal having the minimum interference to perform D2D data transmission. After selecting the available second user terminal having the minimum interference, the first user terminal multiplexes the uplink time-frequency resource of the second user terminal to send D2D data to another user terminal, so that when the first user terminal performs D2D data transmission to other user terminals, the interference caused by cellular transmission is greatly reduced.

Figure 4:
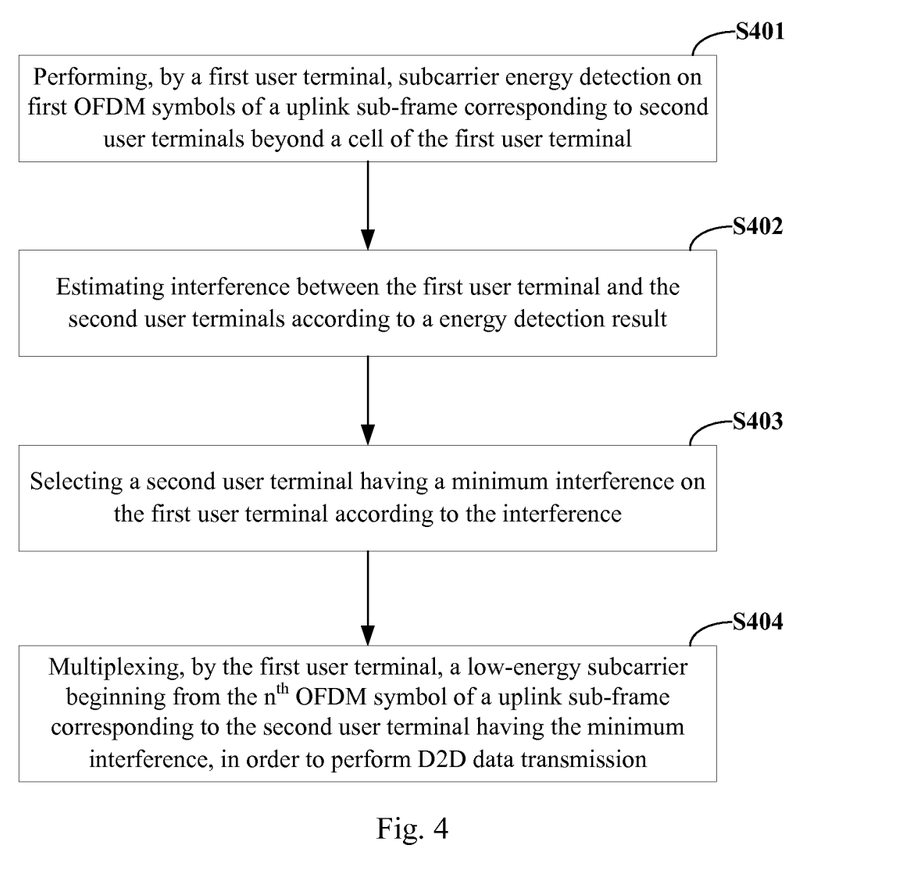
FIG. 4 is a flowchart of still another data transmission method provided by an embodiment of the present disclosure.

A still another data transmission method according to the embodiment of the present disclosure will be described below in detail by taking FIG. 4 as an example. FIG. 4 is a flowchart of a still another data transmission method provided by an embodiment of the present disclosure.

According to the data transmission method in the embodiment, subcarrier energy detection is performed on a first OFDM symbol of a sub-frame to find out a user terminal having the minimum interference. As shown in FIG. 4, the data transmission method provided by the embodiment includes the following steps:

step S401, a first user terminal performs subcarrier energy detection on first OFDM symbols of uplink sub-frames corresponding to second user terminals beyond a cell of the first user terminal when performing information transmission.

Wherein, the first user terminal is a user terminal performing data transmission by use of D2D. The second user terminals are user terminals beyond the cell of the first user terminal, and the user terminals perform data transmission by use of cells. Since the distances between the user terminals in the same cell are small, the mutual interference is large, thus the first user terminal only detects the user terminals performing data transmission by use of cells and beyond the cell thereof, namely, the second user terminals.

The user terminals perform data transmission on corresponding uplink sub-frames, and one sub-frame is composed of multiple OFDM symbols. Multiple subcarriers exist on each OFDM symbol. The OFDM symbols and the subcarriers form a time-frequency resource used during data transmission. Interference between the first user terminal and the second user terminals are estimated just by performing energy detection on the subcarriers on the first OFDM symbols of the corresponding uplink sub-frames.

It should be noted that, the first user terminal may only detect one second user terminal and may also simultaneously detect multiple second user terminals.

Step S402, the interference between the first user terminal and the second user terminals are estimated according to the energy detection result.

Specifically, the energy strength of the subcarriers on the first OFDM symbols of the uplink sub-frames corresponding to the second user terminals is estimated, the weaker the energy of the subcarriers on the first OFDM symbols of the uplink sub-frames corresponding to the second user terminals is, the smaller the interference between the first user terminal and the second user terminals is.

Step S403, the second user terminal having the minimum interference on the first user terminal is selected according to the interference.

The second user terminal corresponding to the uplink sub-frame with the weakest energy of the subcarrier on the first OFDM symbol is selected according to the judging result in step S402.

It should be noted that, when the second user terminal corresponding to the uplink sub-frame with the weakest energy of the subcarrier on the first OFDM symbol could not be selected due to a particular condition, the second user terminal corresponding to the uplink sub-frame with relatively weaker energy of the subcarrier on the first OFDM symbol may be selected.

Step S404, the first user terminal multiplexes a low-energy subcarrier beginning from the $n^{th}$ OFDM symbol of the uplink sub-frame corresponding to the second user terminal having the minimum interference, in order to perform D2D data transmission.

Figure 5:
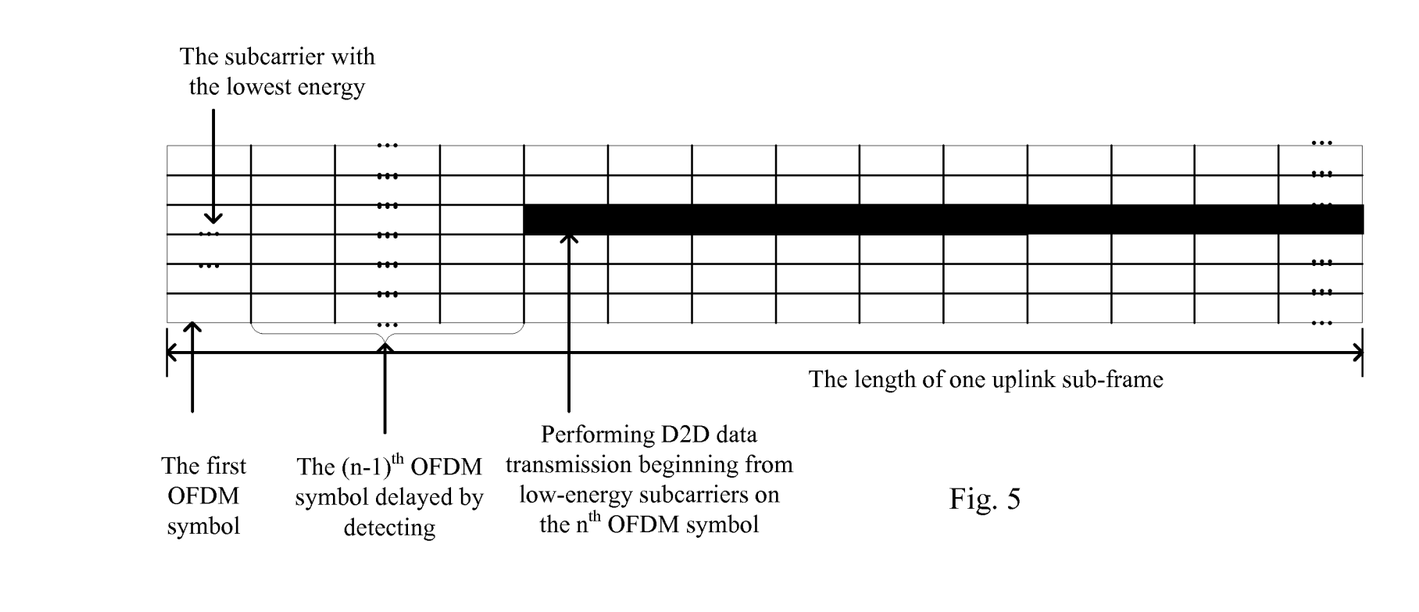
FIG. 5 is a schematic diagram of transmitting data by utilizing a subcarrier in an uplink sub-frame in the embodiment of the present disclosure.

As shown in FIG. 5, it is a schematic diagram of transmitting data by utilizing a subcarrier in an uplink sub-frame of the embodiment of the present disclosure. When a first user terminal performs subcarrier energy detection on the first OFDM symbols of uplink sub-frames corresponding to second user terminals, a time delay will be generated. Therefore, after the second user terminal having the minimum interference is determined, D2D data transmission may only be performed on the subcarrier beginning from the OFDM symbol (i.e., the $n^{th}$ OFDM symbol) after the time delay. The shorter the used detection time delay is, the small the n is, and the more available time-frequency resources during D2D data transmission are.

Furthermore, multiple subcarriers exist on each OFDM symbol, the lower the energy of the subcarriers is, the smaller the interference during data transmission thereof is. Thus, the subcarrier with lower energy is selected to perform D2D data transmission.

Preferably, the first user terminal multiplexes one or multiple low-energy subcarriers beginning from the $n^{th}$ OFDM symbol of the uplink sub-frame corresponding to the second user terminal having the minimum interference, in order to perform D2D data transmission.

The first user terminal multiplexes the low-energy subcarrier beginning from the $n^{th}$ OFDM symbol of the uplink sub-frame corresponding to the second user terminal having the minimum interference to send D2D data to other user terminals, so that when the first user terminal performs D2D data transmission to the other user terminals, the interference caused by cellular transmission is greatly reduced.

Figure 6:
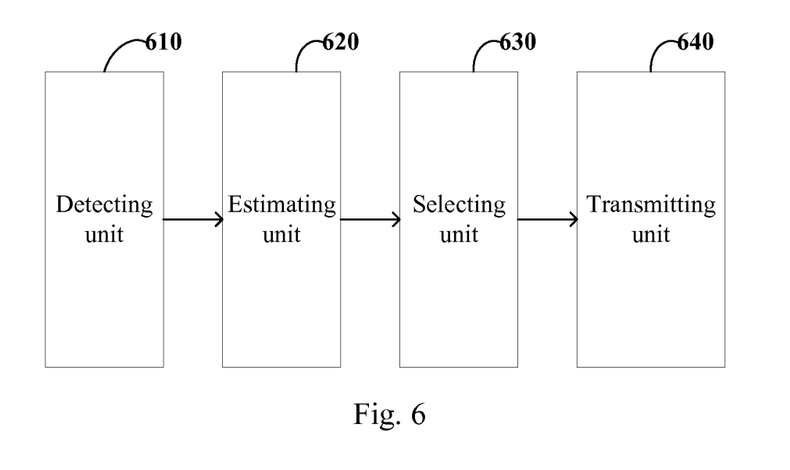
FIG. 6 is a schematic diagram of a structure of a data transmission terminal provided by an embodiment of the present disclosure.

Correspondingly, the embodiment of the present disclosure provides a data transmission terminal. As shown in FIG. 6, it is a schematic diagram of a structure of a data transmission terminal provided by an embodiment of the present disclosure. The data transmission terminal includes a detecting unit 610, a estimating unit 620, a selecting unit 630 and a transmitting unit 640.

The detecting unit 610 is configured to detect PDCCH of second user terminals beyond a cell of the data transmission terminal.

Wherein, the data transmission terminal performs data transmission by use of D2D. The second user terminals are user terminals beyond the cell of the data transmission terminal, and the user terminals perform data transmission by use of cells. Since the distances between the user terminals in the same cell are small, the mutual interference is large, thus the detecting unit 610 only detects the user terminals performing data transmission by use of cells and beyond the cell of the data transmission terminal, namely, the second user terminals.

It should be noted that, the detecting unit 610 may only detect one second user terminal and may also simultaneously detect multiple second user terminals.

Such information is carried in the PDCCH as MCS information, HARQ information and the like, thus the PDCCH of the second user terminal is detected to acquire corresponding information.

Preferably, the detecting unit 610 detects the PDCCH of the second user terminal by means of the ID of the second user terminal.

Preferably, the detecting unit 610 randomly selects the PDCCH for analyzing such fields indicated by the PDCCH as time-frequency resource information and the like to determine whether the data length thereof meets standards, so as to judge whether the PDCCH is a reasonable PDCCH of the second user terminal (namely, a user terminal performing data transmission by use of a cell). If the PDCCH is the reasonable PDCCH of the second user terminal, the PDCCH is detected.

The detecting unit 610 is further configured to acquire the MCS information from the PDCCH.

The MCS information indicates the signal noise ratio of the user terminal, and the signal noise ratio indicates the distance between the user terminal and the base station. The larger the distance between the second user terminal and the base station is, the larger the distance between the second user terminal and the data transmission terminal is, and the smaller the mutual interference is.

The estimating unit 620 is configured to estimate interference between the data transmission terminal and the second user terminals according to the MCS information.

Specifically, the estimating unit 620 compares a modulation order corresponding to the MCS information of the data transmission terminal with the modulation order corresponding to the MCS information of the second user terminal. The larger the difference between the modulation order corresponding to the MCS information of the data transmission terminal and the modulation order corresponding to the MCS information of the second user terminal is, the smaller the interference between the data transmission terminal and the second user terminal is.

The selecting unit 630 is configured to select the second user terminal having the minimum interference on the data transmission terminal according to the interference.

Specifically, the selecting unit 630 selects the second user terminal having the largest difference with the modulation order corresponding to the MCS information of the data transmission terminal, according to the estimating result of the estimating unit 620.

It should be noted that, as long as the modulation order corresponding to the MCS information of the data transmission terminal is different from the modulation order corresponding to the MCS information of the second user terminal, the interference between the data transmission terminal and the second user terminal is quite small, so that when the second user terminal having the largest difference with the modulation order corresponding to the MCS information of the data transmission terminal could not be selected due to a particular condition, the second user terminal different from the modulation order corresponding to the MCS information of the data transmission terminal may also be selected.

The transmitting unit 640 is configured to multiplex an uplink time-frequency resource of the second user terminal having the minimum interference to perform D2D data transmission.

After the selecting unit 630 selects the second user terminal having the minimum interference, the transmitting unit 640 multiplexes the uplink time-frequency resource of the second user terminal to send D2D data to another user terminal, so that when the data transmission terminal performs D2D data transmission to other user terminals, the interference caused by cellular transmission is greatly reduced.

The above-mentioned data transmission terminal is used for implementing the data transmission method of the embodiment as shown in FIG. 2, the included units are merely divided according to functional logic, but are not limited to the above-mentioned division, as long as corresponding functions may be achieved; in addition, the specific titles of the functional units are merely for the convenience of mutual distinguish, and are not used for limiting the protection scope of the present disclosure.

Figure 7:
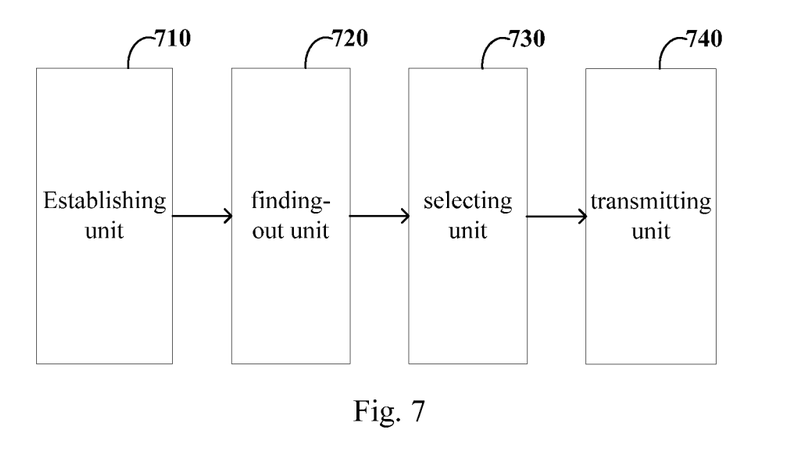
FIG. 7 is a schematic diagram of a structure of another data transmission terminal provided by an embodiment of the present disclosure.

Correspondingly the embodiment of the present disclosure provides another data transmission terminal. As shown in FIG. 7, it is a schematic diagram of a structure of another data transmission terminal provided by an embodiment of the present disclosure. The data transmission terminal includes an establishing unit 710, a finding-out unit 720, a selecting unit 730 and a transmitting unit 740.

The establishing unit 710 is configured to establish an interference mapping table according to interference between the data transmission terminal and second user terminals beyond a cell of the data transmission terminal.

Wherein, the data transmission terminal performs data transmission by use of D2D. The second user terminals are user terminals beyond the cell of the data transmission terminal, and the user terminals perform data transmission by use of cells. Since the distances between the user terminals in the same cell are small, the mutual interference is large, thus only the user terminals performing data transmission by use of cells and beyond the cell of the data transmission terminal, namely, the second user terminals, are detected.

Preferably, the establishing unit 710 is specifically configured to detect the PDCCH of the second user terminals beyond the cell of the data transmission terminal; perform PDSCH signal energy detection on sub-frames corresponding to time-frequency resource information indicated by the PDCCH during data transmission of the second user terminals; the smaller the PDSCH signal energy is, the smaller the interference between the data transmission terminal and the second user terminals is; and establish the interference mapping table between the data transmission terminal and multiple second user terminals according to the detection result.

Wherein, the data transmission terminal detects the PDCCH of the second user terminal by means of the ID of the second user terminal. Or, the data transmission terminal randomly selects the PDCCH for analyzing such fields indicated by the PDCCH as time-frequency resource information and the like to determine whether the data length thereof meets standards, so as to judge whether the PDCCH is a reasonable PDCCH of the second user terminal (namely, a user terminal performing data transmission by use of a cell). If the PDCCH is the reasonable PDCCH of the second user terminal, the PDCCH is detected.

Preferably, the establishing unit 710 is specifically configured to detect the Sounding signals of the second user terminals beyond the cell of the data transmission terminal; the weaker the Sounding signals are, the smaller the interference between the data transmission terminal and the second user terminals is; and establish the interference mapping table between the data transmission terminal and multiple second user terminals according to the detection result.

The finding-out unit 720 is configured to find out multiple second user terminals having small interference on the data transmission terminal according to the interference mapping table.

The interference between the first user terminal and multiple second user terminals are included in the interference mapping table. Multiple second user terminals having small interference on the first user terminal are found out according to the interference mapping table. The degree of the small interference may be selected differently according to different conditions.

The selecting unit 730 is configured to select an available second user terminal having the minimum interference from the multiple second user terminals having small interference on the data transmission terminal;

when the second user terminal having the minimum interference on the first user terminal in the interference mapping table could not be selected due to a particular condition, the selecting unit 730 selects the second user terminal having smaller interference on the first user terminal in the interference mapping table, namely, the selecting unit 730 selects the available second user terminal having the minimum interference.

The transmitting unit 740 is configured to multiplex an uplink time-frequency resource of the available second user terminal having the minimum interference to perform D2D data transmission.

After the selecting unit 730 selects the available second user terminal having the minimum interference, the transmitting unit 740 multiplexes the uplink time-frequency resource on the second user terminal to send D2D data to another user terminal, so that when the data transmission terminal performs D2D data transmission to other user terminals, the interference caused by cellular transmission is greatly reduced.

The above-mentioned data transmission terminal is used for implementing the data transmission method of the embodiment as shown in FIG. 3, the included units are merely divided according to functional logic, but are not limited to the above-mentioned division, as long as corresponding functions may be achieved; in addition, the specific titles of the functional units are merely for convenience of mutual distinguish, and are not used for limiting the protection scope of the present disclosure.

Figure 8:
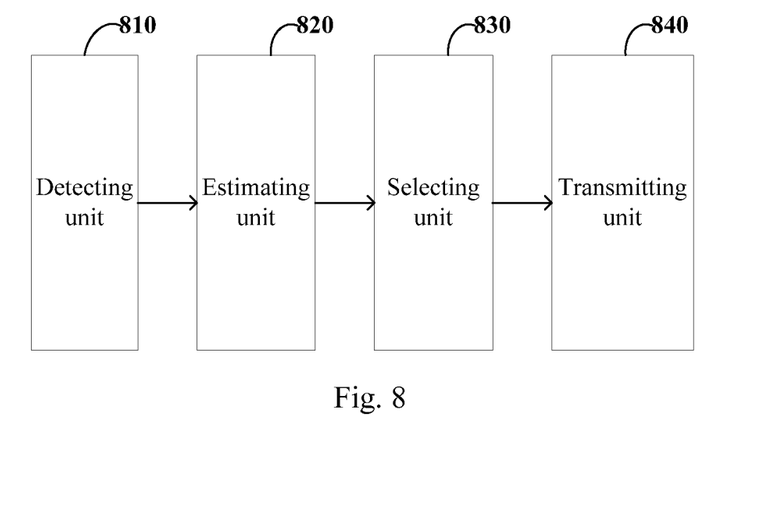
FIG. 8 is a schematic diagram of a structure of still another data transmission terminal provided by an embodiment of the present disclosure.

Correspondingly the embodiment of the present disclosure provides a still another data transmission terminal. As shown in FIG. 8, it is a schematic diagram of a structure of a still another data transmission terminal provided by an embodiment of the present disclosure. The data transmission terminal includes a detecting unit 810, a estimating unit 820, a selecting unit 830 and a transmitting unit 840.

The detecting unit 810 is configured to perform subcarrier energy detection on first OFDM symbols of uplink sub-frames corresponding to second user terminals beyond the cell of the data transmission terminal when performing information transmission.

Wherein, the data transmission terminal performs data transmission by use of D2D. The second user terminals are user terminals beyond the cell of the data transmission terminal, and the user terminals perform data transmission by use of cells. Since the distances between the user terminals in the same cell are small, the mutual interference is large, thus the detecting unit 810 only detects the user terminals performing data transmission by use of cells and beyond the cell of the data transmission terminal, namely, the second user terminals.

The user terminals perform data transmission on corresponding uplink sub-frames, and one sub-frame is composed of multiple OFDM symbols. Multiple subcarriers exist on each OFDM symbol. The OFDM symbols and the subcarriers form a time-frequency resource used during data transmission. Interference between the data transmission terminal and the second user terminals are estimated, and the detecting unit 810 only needs to perform energy detection on the subcarriers of the first OFDM symbols of the corresponding uplink sub-frames.

It should be noted that, the detecting unit 810 may only detect one second user terminal and may also simultaneously detect multiple second user terminals.

The estimating unit 820 is configured to estimate the interference between the data transmission terminal and the second user terminals according to the energy detection result.

The estimating unit 820 is specifically configured to estimate the energy strength of the subcarriers on the first OFDM symbols of the uplink sub-frames corresponding to the second user terminals, the weaker the energy of the subcarriers on the first OFDM symbols of the uplink sub-frames corresponding to the second user terminals is, the smaller the interference between the data transmission terminal and the second user terminals is.

The selecting unit 830 is configured to select the second user terminal having the minimum interference on the data transmission terminal according to the interference.

The second user terminal corresponding to the uplink sub-frame with the weakest energy of the subcarrier on the first OFDM symbol is selected according to the estimating result of the estimating unit 820.

It should be noted that, when the selecting unit 830 could not select the second user terminal corresponding to the uplink sub-frame with the weakest energy of the subcarrier on the first OFDM symbol due to a particular condition, the selecting unit 830 may select the second user terminal corresponding to the uplink sub-frame with relatively weaker energy of the subcarrier on the first OFDM symbol.

The transmitting unit 840 is configured to multiplex a low-energy subcarrier beginning from the $n^{th}$ OFDM symbol of the uplink sub-frame corresponding to the second user terminal having the minimum interference, in order to perform D2D data transmission.

When the detecting unit 810 performs the subcarrier energy detection on the first OFDM symbols of the uplink sub-frames corresponding to the second user terminals, a time delay will be generated. Therefore, after determining the second user terminal having the minimum interference, the transmitting unit 840 may only perform D2D data transmission on the subcarrier beginning from the OFDM symbol (i.e., the $n^{th}$ OFDM symbol) after the time delay. The shorter the detection time delay used by the detecting unit 810 is, the smaller the n is, the more available time-frequency resources during D2D data transmission are.

Furthermore, multiple subcarriers exist on each OFDM symbol, the lower the energy of the subcarriers is, the smaller the interference during data transmission thereof is. Thus, the transmitting unit 840 selects the subcarrier with lower energy to perform D2D data transmission.

Preferably, the transmitting unit 840 multiplexes one or multiple low-energy subcarriers beginning from the $n^{th}$ OFDM symbol of the uplink sub-frame corresponding to the second user terminal having the minimum interference, in order to perform D2D data transmission.

The transmitting unit 840 multiplexes the low-energy subcarrier beginning from the $n^{th}$ OFDM symbol of the uplink sub-frame corresponding to the second user terminal having the minimum interference to send D2D data to other user terminals, so that when the data transmission terminal performs D2D data transmission to the other user terminals, the interference caused by cellular transmission is greatly reduced.

The above-mentioned data transmission terminal is used for implementing the data transmission method of the embodiment as shown in FIG. 4, the included units are merely divided according to functional logic, but are not limited to the above-mentioned division, as long as corresponding functions may be achieved; in addition, the specific titles of the functional units are merely for convenience of mutual distinguish, and are not used for limiting the protection scope of the present disclosure.

Figure 9:
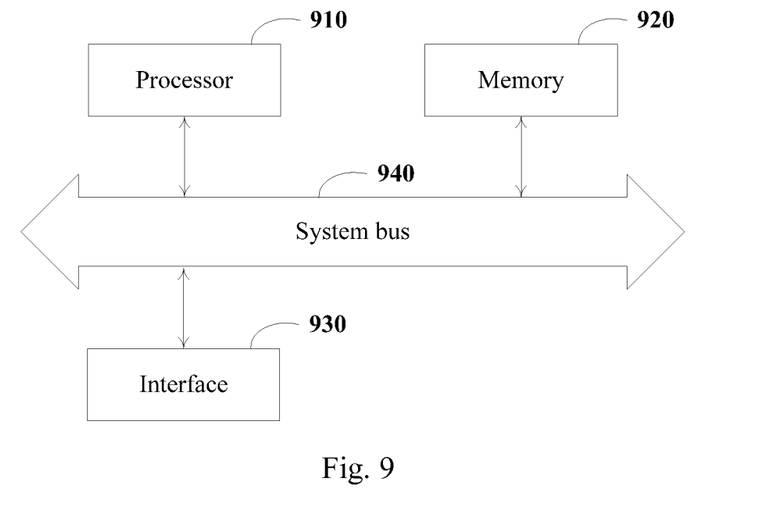
FIG. 9 is a schematic diagram of another structure of a data transmission terminal provided by an embodiment of the present disclosure.

In addition, the data transmission terminal used for implementing the data transmission method of the embodiment as shown in FIG. 2 may also be implemented in the following manner, as shown in FIG. 9. It is a schematic diagram of another structure of a data transmission terminal provided by an embodiment of the present disclosure. The data transmission terminal includes a processor 910, a memory 920, an interface 930 and a system bus 940.

The system bus 940 is configured to connect the processor 910, the memory 920 and the interface 930.

The processor 910 is configured to detect PDCCH of second user terminals beyond the cell of the data transmission terminal, and acquire MCS information from the PDCCH; estimate interference between the data transmission terminal and the second user terminals according to the MCS information; select the second user terminal having the minimum interference on the data transmission terminal according to the interference; and multiplex an uplink time-frequency resource of the second user terminal having the minimum interference to perform D2D data transmission.

Wherein the specific process of estimating the interference between the data transmission terminal and second user terminals according to the MCS information is as follows: each MCS information is corresponding to one modulation order; during estimating, the modulation order corresponding to the MCS information of the data transmission terminal is compared with the modulation order corresponding to the MCS information of the second user terminal; the larger the difference between the modulation order corresponding to the MCS information of the data transmission terminal and the modulation order corresponding to the MCS information of the second user terminal is, the smaller the interference between the data transmission terminal and the second user terminal is.

The memory 920 is configured to store the execution flow of the processor 910.

The interface 930 is configured to perform D2D data transmission with other user terminals.

Figure 10:
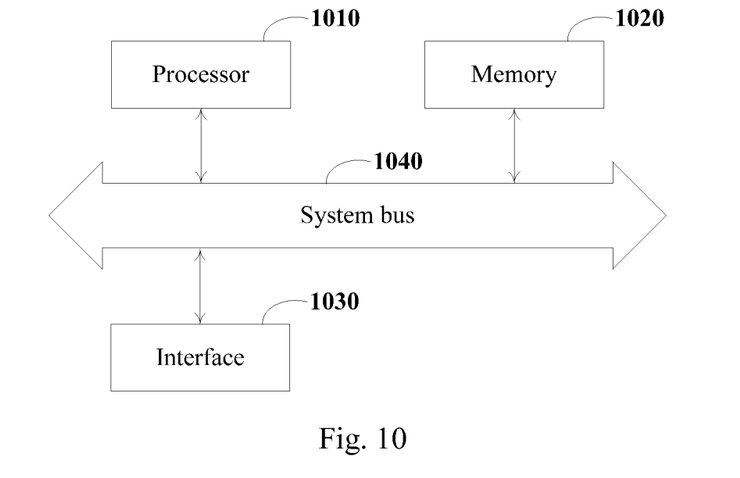
FIG. 10 is a schematic diagram of another structure of another data transmission terminal provided by an embodiment of the present disclosure.

The data transmission terminal used for implementing the data transmission method of the embodiment as shown in FIG. 3 may also be implemented in the following manner, as shown in FIG. 10, which is a schematic diagram of another structure of another data transmission terminal provided by an embodiment of the present disclosure. The data transmission terminal includes a processor 1010, a memory 1020, an interface 1030 and a system bus 1040.

The system bus 1040 is configured to connect the processor 1010, the memory 1020 and the interface 1030.

The processor 1010 is configured to establish an interference mapping table according to interference between the data transmission terminal and second user terminals beyond the cell of the data transmission terminal; find out multiple second user terminals having the minimum interference on the data transmission terminal according to the interference mapping table; select an available second user terminal having the minimum interference from the multiple second user terminals having small interference on the first user terminal; and multiplex an uplink time-frequency resource of the available second user terminal having the minimum interference to perform D2D data transmission.

Wherein the process of establishing the interference mapping table is as follows:

preferably, detecting the PDCCH of the second user terminals beyond the cell of the data transmission terminal; performing PDSCH signal energy detection on sub-frames corresponding to time-frequency resource information indicated by the PDCCH during data transmission of the second user terminals; the smaller the PDSCH signal energy is, the smaller the interference between the data transmission terminal and the second user terminals is, and establishing the interference mapping table between the data transmission terminal and multiple second user terminals.

Preferably, detecting the Sounding signals of the second user terminals beyond the cell of the data transmission terminal; the weaker the Sounding signals are, the smaller the interference between the data transmission terminal and the second user terminals is, and establishing the interference mapping table between the data transmission terminal and multiple second user terminals.

The memory 1020 is configured to store the execution flow of the processor 1010.

The interface 1030 is configured to perform D2D data transmission with other user terminals.

Figure 11:
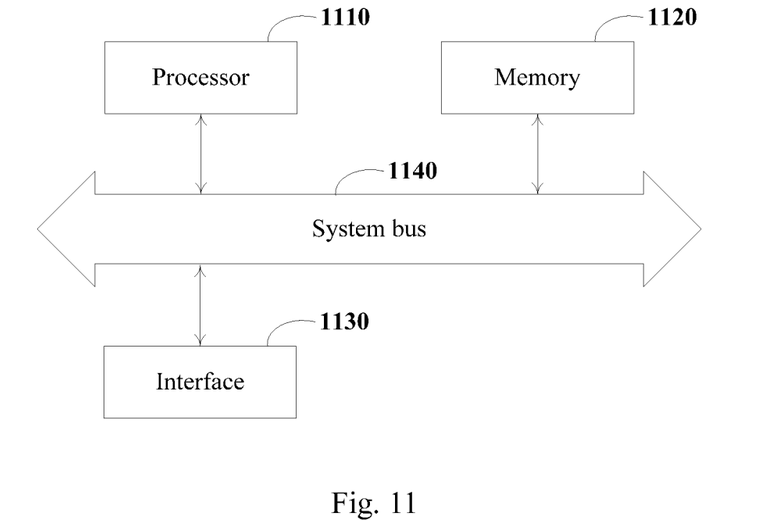
FIG. 11 is a schematic diagram of another structure of still another data transmission terminal provided by an embodiment of the present disclosure.

The data transmission terminal used for implementing the data transmission method of the embodiment as shown in FIG. 4 may also be implemented in the following manner, as shown in FIG. 11, which is a schematic diagram of another structure of a third data transmission terminal provided by an embodiment of the present disclosure. The data transmission terminal includes a processor 1110, a memory 1120, an interface 1130 and a system bus 1140.

The system bus 1140 is configured to connect the processor 1110, the memory 1120 and the interface 1130.

The processor 1110 is configured to perform subcarrier energy detection on first OFDM symbols of uplink sub-frames corresponding to second user terminals beyond the cell of the data transmission terminal; estimate interference between the data transmission terminal and the second user terminals according to the energy detection result; select the second user terminal having the minimum interference on the data transmission terminal according to the interference; and multiplex a low-energy subcarrier beginning from the $n^{th}$ OFDM symbol of the uplink sub-frame corresponding to the second user terminal having the minimum interference, in order to perform D2D data transmission.

Wherein the specific process of judging the interference between the data transmission terminal and the second user terminals according to the energy detection result is as follows: judging the energy strength of the subcarriers on the first OFDM symbols of the uplink sub-frames corresponding to the second user terminals; the weaker the energy of the subcarriers on the first OFDM symbols of the uplink sub-frames corresponding to the second user terminals is, the smaller the interference between the data transmission terminal and the second user terminals is.

The memory 1120 is configured to store the execution flow of the processor 1110.

The interface 1130 is configured to perform D2D data transmission with other user terminals.

By adopting the data transmission method and terminal provided by the embodiments of the present disclosure, before the user terminal performs D2D data transmission, the user terminal having the minimum interference on the user terminal is detected and found out, and the time-frequency resource of the user terminal having the minimum interference is multiplexed, so as to ensure the minimum interference generated by cellular transmission on the user terminal during D2D transmission.

Those skilled may be further aware that, units and algorithm steps of the examples described in the embodiments disclosed in this paper may be implemented by electronic hardware, computer software, or a combination of the two, in order to clearly illustrate the interchangeability of hardware and software, and the composition and the steps of the examples have been described generally in the above-mentioned illustration according to functions. Whether these functions are implemented in the form of hardware or software is determined by specific applications and design constraint conditions of the technical solutions. Those skilled may implement the described functions by using different methods for each specific application, but this implementation should not be considered as beyond the scope of the present disclosure.

The steps of the method or the algorithm described in the embodiments disclosed in this paper may be implemented by hardware, a software module executed by a processor or the combination of the two. The software module may be built in a random access memory (RAM), an internal memory, a read-only memory (ROM), an electrically programmable ROM, an electrically erasable programmable ROM, a register, a hard disk, a removable disk, a CD-ROM, or any other forms of storage media known in the technical field.

The purposes, technical solutions and beneficial effects of the present disclosure are further illustrated in detail in the above specific embodiments. It should be understood that, the foregoing descriptions are merely specific embodiments of the present disclosure, rather than limiting the protection scope of the present disclosure. Any modifications, equivalent substitutions, improvements or the like, made within the spirit and principle of the present disclosure, shall fall within the protection scope of the present disclosure.

What is claimed is:

1. A data transmission method, comprising:
    detecting, by a first user terminal, physical downlink control channel (PDCCH) of second user terminals beyond a cell of the first user terminal, and acquiring modulation and coding scheme information from the PDCCH;
    estimating interference between the first user terminal and the second user terminals according to the modulation and coding scheme information;
    selecting a second user terminal having a minimum interference on the first user terminal according to the interference; and
    multiplexing, by the first user terminal, an uplink time-frequency resource of the second user terminal having the minimum interference to perform D2D data transmission.

2. The method of claim 1, wherein the estimating interference between the first user terminal and the second user terminals according to the modulation and coding scheme information,
    wherein the modulation and coding scheme information is corresponding to one modulation order; and
    the method comprises:
    comparing a modulation order corresponding to the modulation and coding scheme information of the first user terminal with a modulation order corresponding to the modulation and coding scheme information of the second user terminals;
    wherein the larger the difference between the modulation order corresponding to the modulation and coding scheme information of the first user terminal and the modulation order corresponding to the modulation and coding scheme information of the second user terminals is, the smaller the interference between the first user terminal and the second user terminals is.

3. The method of claim 1, wherein the detecting, by a first user terminal, PDCCH of second user terminals beyond a cell of the first user terminal, comprises:
    detecting, by the first user terminal, the PDCCH of the second user terminals through ID of the second user terminals.

4. The method of claim 1, wherein the detecting, by a first user terminal, PDCCH of second user terminals beyond a cell of the first user terminal, comprises:
    randomly selecting PDCCH for analysis to judge whether the PDCCH meets predetermined standards; and
    if the PDCCH meets the predetermined standards, detecting the PDCCH.

5. A data transmission terminal, comprising: a processor and a non-transitory computer-readable medium, the non-transitory computer-readable medium having processor-executable instructions stored thereon, the processor-executable instructions, when executed by the processor, facilitating the following:
    detecting PDCCH of second user terminals beyond a cell of the data transmission terminal, and acquire modulation and coding scheme information from the PDCCH;
    estimating interference between the data transmission terminal and the second user terminals according to the modulation and coding scheme information;
    selecting a second user terminal having a minimum interference on the data transmission terminal according to the interference; and
    multiplexing an uplink time-frequency resource of the second user terminal having the minimum interference to perform D2D data transmission.

6. The terminal of claim 5, wherein the modulation and coding scheme information is corresponding to one modulation order, and wherein the processor-executable instructions, when executed by the processor, facilitate:
    comparing a modulation order corresponding to the modulation and coding scheme information of the data transmission terminal with a modulation order corresponding to the modulation and coding scheme information of the second user terminals; and
    wherein the larger the difference between the modulation order corresponding to the modulation and coding scheme information of the data transmission terminal and the modulation order corresponding to the modulation and coding scheme information of the second user terminals is, the smaller the interference between the data transmission terminal and the second user terminals is.

7. The terminal of claim 5, wherein the processor-executable instructions, when executed by the processor, further facilitate:
    detecting the PDCCH of the second user terminals through ID of the second user terminals.

8. The terminal of claim 5, wherein the processor-executable instructions, when executed by the processor, facilitate:
    randomly selecting PDCCH for analysis to judge whether the PDCCH meets predetermined standards; and
    if the PDCCH meets the predeterminded standards, detecting the PDCCH.

9. A data transmission terminal, comprising: a processor and a non-transitory computer-readable medium, the non-transitory computer-readable medium having processor-executable instructions stored thereon, the processor-executable instructions, when executed by the processor, facilitating the following:
    establishing an interference mapping table according to interference between the data transmission terminal and second user terminals beyond a cell of the data transmission terminal;
    finding out multiple second user terminals having small interference on the data transmission terminal according to the interference mapping table;
    selecting an available second user terminal having a minimum interference from the multiple second user terminals having small interference on the data transmission terminal; and
    multiplexing an uplink time-frequency resource of the available second user terminal having the minimum interference to perform D2D data transmission.

10. The terminal of claim 9, wherein the processor-executable instructions, when executed by the processor, facilitate:
    detecting PDCCH of the second user terminals beyond the cell of the data transmission terminal;
    performing PDSCH signal energy detection on a subframe corresponding to time-frequency resource information indicated by the PDCCH of the second user terminals when transmitting data;
    wherein the smaller the PDSCH signal energy is, the smaller the interference between the data transmission terminal and the second user terminals is; and
    establishing the interference mapping table according to a detection result.

11. The terminal of claim 9, wherein the processor-executable instructions, when executed by the processor, facilitate:
  detecting Sounding signals of the second user terminals beyond the cell of the data transmission terminal;
  the weaker the Sounding signals are, the smaller the interference between the data transmission terminal and the second user terminals is; and
  establishing the interference mapping table according to a detection result.

12. The terminal of claim 10, wherein the detecting PDCCH of the second user terminals beyond the cell of the data transmission terminal, comprises:
  detecting the PDCCH of the second user terminals through ID of the second user terminals.

13. The terminal of claim 10, wherein the detecting PDCCH of the second user terminals beyond the cell of the data transmission terminal, comprises:
  randomly selecting PDCCH for analysis to judge whether the PDCCH meets predetermined standards; and
  if the PDCCH meets the predetermined standards, detecting the PDCCH.

14. A data transmission terminal, comprising: a processor and a non-transitory computer-readable medium, the non-transitory computer-readable medium having processor-executable instructions stored thereon, the processor-executable instructions, when executed by the processor, facilitating the following:
  preforming subcarrier energy detection on first OFDM symbols of a uplink sub-frame corresponding to second user terminals beyond a cell of the data transmission terminal;
  estimating interference between the data transmission terminal and the second user terminals according to an energy detection result;
  selecting a second user terminal having a minimum interference on the data transmission terminal according to the interference; and
  multiplexing at least one low-energy subcarrier beginning from the $n^{th}$ OFDM symbol of a uplink sub-frame corresponding to the second user terminal having the minimum interference, in order to perform D2D data transmission.

15. The terminal of claim 14, wherein the processor-executable instructions, when executed by the processor, facilitate:
  estimating energy strength of subcarriers on the first OFDM symbols of the uplink sub-frame corresponding to the second user terminals;
  the weaker the energy of the subcarriers on the first OFDM symbols of the uplink sub-frame corresponding to the second user terminals is, the smaller the interference between the data transmission terminal and the second user terminals is.

* * * * *